(12) United States Patent
Hirayama

(10) Patent No.: US 7,766,062 B2
(45) Date of Patent: Aug. 3, 2010

(54) PNEUMATIC RADIAL TIRE HAVING BASE TREAD AND CAP TREAD WITH THE BASE TREAD INCLUDING KRAFT PAPER GROUND PRODUCT

(75) Inventor: Michio Hirayama, Kobe (JP)

(73) Assignee: Sumitomo Rubber Industries, Ltd., Hyogo (JP)

( * ) Notice: Subject to any disclaimer, the term of this patent is extended or adjusted under 35 U.S.C. 154(b) by 827 days.

(21) Appl. No.: 11/335,544

(22) Filed: Jan. 20, 2006

(65) Prior Publication Data

US 2006/0174987 A1 Aug. 10, 2006

(30) Foreign Application Priority Data

Feb. 4, 2005 (JP) ............................. 2005-028438

(51) Int. Cl.
*B60C 1/00* (2006.01)
*B60C 11/00* (2006.01)
(52) U.S. Cl. .................. 152/209.5; 152/209.4; 152/458
(58) Field of Classification Search .............. 152/209.4, 152/209.5, 458
See application file for complete search history.

(56) References Cited

U.S. PATENT DOCUMENTS

| | | | | |
|---|---|---|---|---|
| 3,697,364 A | * | 10/1972 | Boustany et al. | 264/108 |
| 3,802,478 A | * | 4/1974 | Boustany et al. | 152/537 |
| 4,125,493 A | | 11/1978 | Posiviata et al. | |
| 5,591,279 A | * | 1/1997 | Midorikawa et al. | 152/209.4 |
| 5,967,211 A | * | 10/1999 | Lucas et al. | 152/209.4 |
| 6,058,994 A | * | 5/2000 | Amino et al. | 152/905 |
| 6,302,173 B1 | * | 10/2001 | Mizuno et al. | 152/209.4 |
| 6,340,041 B1 | * | 1/2002 | Sugihara et al. | 152/209.5 |
| 6,516,847 B1 | * | 2/2003 | Amaddeo et al. | 152/209.5 |
| 2002/0037950 A1 | * | 3/2002 | Mizuno et al. | 524/495 |

FOREIGN PATENT DOCUMENTS

| | | | |
|---|---|---|---|
| EP | 592218 | * | 4/1994 |
| EP | 1 008 466 | | 6/2000 |
| JP | 53-123450 | | 10/1978 |
| JP | 1-145205 A | | 6/1989 |
| JP | 1-153305 A | | 6/1989 |
| JP | 6-200076 A | | 7/1994 |

(Continued)

*Primary Examiner*—Steven D Maki
(74) *Attorney, Agent, or Firm*—Birch, Stewart, Kolasch & Birch, LLP

(57) ABSTRACT

A pneumatic radial tire that can improve maneuver stability while maintaining riding comfort is provided. The pneumatic radial tire has a tire tread including at least two layers of a base tread and a cap tread arranged externally in a radial direction of the base tread. The base tread is formed by a base tread rubber composition including at least 2-20 parts by weight of a kraft paper ground product relative to 100 parts by weight of a rubber component. The base tread has its ratio $E^*a/E^*b$ of a complex elastic modulus in a circumferential direction $E^*a$ to a complex elastic modulus in a tire radial direction $E^*b$ set to be at least 1.5, each of the complex elastic moduli $E^*a$ and $E^*b$ being measured at a temperature of 70° C., a frequency of 10 Hz, and a dynamic strain of ±1% at a tire maximum width position in a state where the tire is attached to a rim and filled to a prescribed internal pressure.

5 Claims, 1 Drawing Sheet

FOREIGN PATENT DOCUMENTS

| | | |
|---|---|---|
| JP | 11-180108 A | 7/1999 |
| JP | 11-255966 A | 9/1999 |
| JP | 2002-155164 A | 5/2002 |
| JP | 2002-226634 A | 8/2002 |
| JP | 2002-249619 A | 9/2002 |
| JP | 2003-291610 A | 10/2003 |

* cited by examiner

PNEUMATIC RADIAL TIRE HAVING BASE TREAD AND CAP TREAD WITH THE BASE TREAD INCLUDING KRAFT PAPER GROUND PRODUCT

This nonprovisional application is based on Japanese Patent Application No. 2005-028438 filed with the Japan Patent Office on Feb. 4, 2005, the entire contents of which are hereby incorporated by reference.

BACKGROUND OF THE INVENTION

1. Field of the Invention

The present invention relates to a pneumatic radial tire that can improve maneuvering stability while maintaining riding comfort and durability.

2. Description of the Background Art

In recent years, remarkably enhanced equipment and performance of automobiles and well-developed network of roads have been giving rise to demands for tires with constantly stable maneuvering performance. In particular, improvements in maneuvering performance such as braking performance when driving at a high speed, riding comfort and the like are increasingly demanded. As methods for improving braking performance of tires, a method of increasing the rigidity in to and from direction of the tire or the like has conventionally been employed. For example, a method of providing a tread with high rigidity is known.

Japanese Patent Laying-Open No. 01-145205 proposes a radial tire, wherein a ratio $Ea^*/Eb^*$ of a complex elastic modulus in the tire axial direction $Ea^*$ to a complex elastic modulus in the tire radial direction $Eb^*$ is set to be greater than 1.5, and wherein a tread is formed using tread rubber preferably including short fibers, in order to attain compatibility between maneuvering stability and riding comfort.

Japanese Patent Laying-Open No. 01-153305 proposes a radial tire aiming to prevent unbalanced wear, deterioration of the appearance and lifetime of the tire and to improve maneuvering stability and braking performance, wherein a groove wall disposed on a groove provided to a tread portion is formed using reinforced rubber. The reinforced rubber is constituted by a rubber base including at least one of natural rubber, polyisoprene rubber, butadiene rubber and polybutadiene based rubber, with which short fibers are compounded. The short fibers are oriented in the depth direction of the groove along the surface of the groove wall.

Japanese Patent Laying-Open No. 06-200076 proposes a radial tire aiming to decrease rolling resistance and to improve maneuvering stability while maintaining riding comfort. The radial tire includes a base tread having a thickness of at most 6 mm. The base tread includes 16-30 parts by weight of short fibers and 30-60 parts by weight of carbon black having an iodine adsorption of 60-130 mg/g relative to total 100 parts by weight of a rubber component.

Japanese Patent Laying-Open No. 11-180108 proposes a pneumatic tire aiming to ensure conductivity with small amount of carbon and further to decrease rolling resistance. In the pneumatic tire, a tread portion is constituted by: a base rubber body arranged internally in the radial direction and formed by a conductive rubber material having a volume specific resistance of less than $1 \times 10^8 \Omega$; a cap rubber body arranged externally to the base rubber body to thereby form a tread surface and reinforced by silica; and a conductive portion having its inner end coupled to the base rubber body to penetrate the cap rubber body externally in the radial direction, while its outer end forms part of the tread surface. The conductive rubber material includes conductive short fibers wherein reinforcing short fibers are coated by a conductive material to attain conductivity.

Japanese Patent Laying-Open No. 11-255966 proposes a rubber composition for a tire tread aiming to obtain a tire that has less reduction in wear resistance and that is excellent in balance of traction performance, braking performance and cornering performance. The rubber composition is obtained by compounding, relative to 100 parts by weight of a rubber component, 5-45 parts by weight of silica, 0.5-4.0 part by weight of a silane coupling agent and 3-8 parts by weight of a cellulose substance-containing powdery processed article.

Japanese Patent Laying-Open No. 2002-155164 proposes a rubber composition that provides excellent maneuver stability, wear-resistance, wet property and fuel-efficiency. The rubber composition is obtained by compounding, relative to 100 parts: by weight of natural rubber and/or diene type synthetic rubber, 10-120 parts by weight of silica having a cetyltrimethylammonium bromide adsorption specific surface area (CTAB) of 30-135 $m^2/g$, 1-20 parts by weight of organic short fibers having an average diameter of 0.05-50 µm and an average length of 10-2000 µm.

However, for example when short fibers of general organic fibers are compounded, often rubber hardness is small and maneuver stability and durability are reduced, if riding comfort is excellent. Accordingly, an improvement is still necessary in attaining compatibility between riding comfort and maneuver stability.

SUMMARY OF THE INVENTION

An object of the present invention is to provide a pneumatic radial tire that can solve the aforementioned problem and that can improve maneuver stability while maintaining excellent riding comfort and durability.

The present invention relates to a pneumatic radial tire having a tire tread including at least two layers of a base tread and a cap tread arranged externally in a radial direction of the base tread. The base tread is formed by a base tread rubber composition including at least 2-20 parts by weight of a kraft paper ground product relative to 100 parts by weight of a rubber component. The base tread has its ratio $E^*a/E^*b$ of a complex elastic modulus in a circumferential direction $E^*a$ to a complex elastic modulus in a tire radial direction $E^*b$ set to be at least 1.5, each of the complex elastic moduli $E^*a$ and $E^*b$ being measured at a temperature of 70° C., a frequency of 10 Hz, and a dynamic strain of ±1% at a tire maximum width position in a state where the tire is attached to a rim and filled to a prescribed internal pressure.

In the present invention, preferably a tensile strength of the base tread in the tire circumferential direction is at least 10 MPa.

In the present invention, preferably the base tread rubber composition includes 0.1-5 parts by weight of a silane coupling agent relative to 100 parts by weight of the rubber component.

In the present invention, preferably a thickness of the base tread relative to a total thickness of the tire tread is set to fall within a range of 5-40%.

In the present invention, preferably a ratio $E^*a/E^*c$ of the complex elastic modulus $E^*a$ to a complex elastic modulus in the tire circumferential direction $E^*c$ of the cap tread (2b) is set to fall within a range of 1.1-10, each of the complex elastic moduli $E^*a$ and $E^*c$ being measured at a temperature of 70° C., a frequency of 10 Hz, and a dynamic strain of ±1% at a tire maximum width position in a state where the tire is attached to a rim and filled to a prescribed internal pressure.

In the present invention, preferably an average length of the kraft paper ground product falls within a range of 10-1000 μm.

According to the present invention, a pneumatic radial tire that can improve maneuver stability while maintaining riding comfort and durability can be provided, by forming a tire tread including at least two layers of a base tread and a cap tread, using a rubber composition including a kraft paper ground product as the base tread, and setting a complex elastic modulus of the base tread in the tire circumferential direction to be at least a certain value relative to a complex elastic modulus thereof in the tire radial direction.

The foregoing and other objects, features, aspects and advantages of the present invention will become more apparent from the following detailed description of the present invention when taken in conjunction with the accompanying drawings.

DESCRIPTION OF THE PREFERRED EMBODIMENTS

Figure 1:
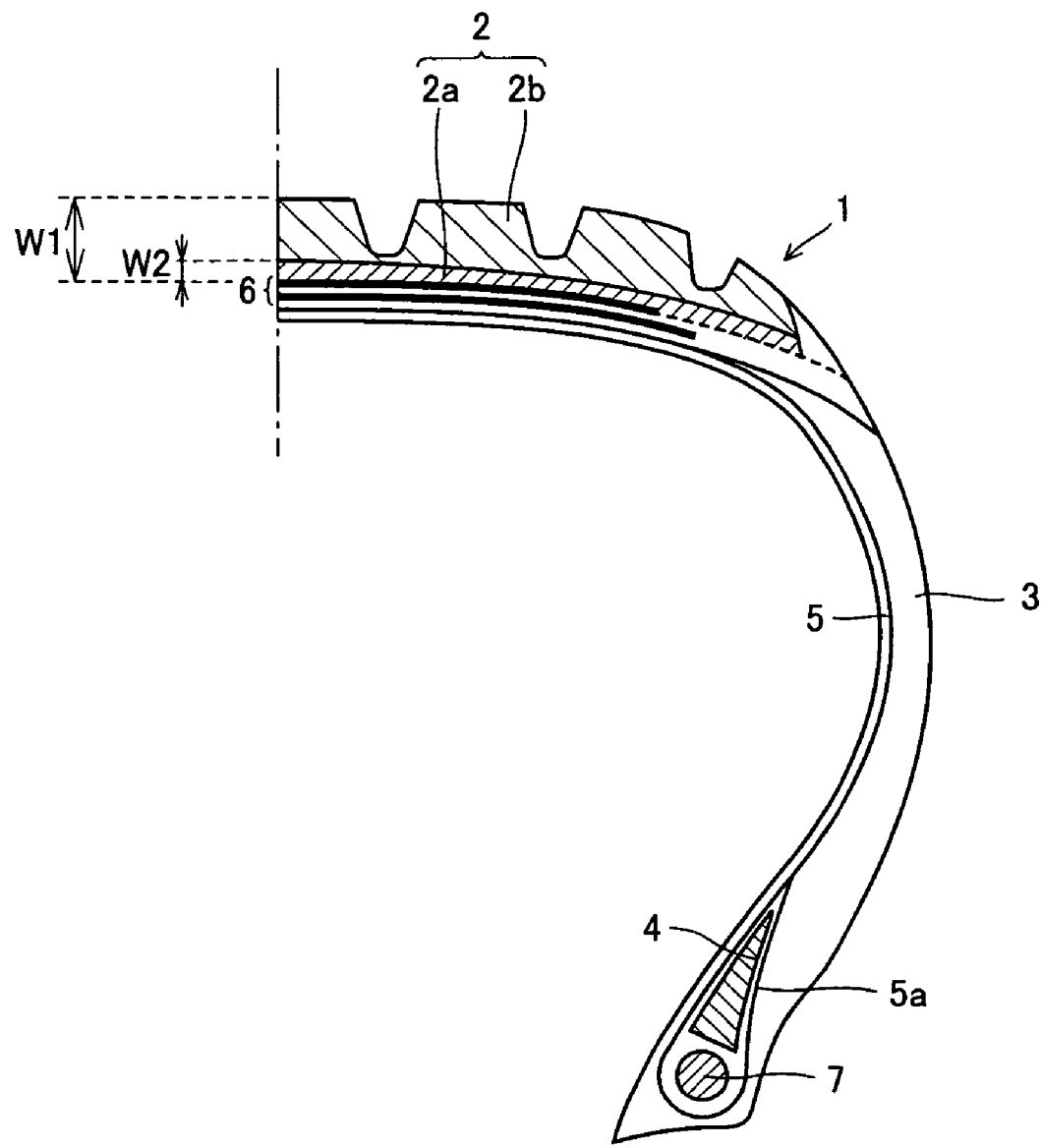
FIG. 1 is a right half cross section of a pneumatic tire according to the present invention.

A pneumatic radial tire of the present invention may widely be applied to passenger automobiles, trucks and buses, heavy equipment and the like. A tire 1 includes a tread portion 2, a pair of sidewall portions 3 extending from respective ends of tread portion 2 inwardly in the radial direction of tire 1, and bead portions 4 each located at the inner end of sidewall portion 3. A carcass 5 is provided to extend between bead portions 4, 4, and a belt layer 6 having hoop effect is further arranged in the radial direction outside carcass 5.

Carcass 5 is formed of at least one carcass ply having a carcass cord arranged at an angle of 70-90° relative to tire equator, for example. The carcass ply extends from tread portion 2 to a bead core 7 of bead portion 4 through side wall portion 3 and further extends around bead core 7 where the carcass ply is folded back from the inside to the outside relative to the direction of the tire axis to be secured by a fold-back portion 5a.

Belt layer 6 is formed of at least two belt plies having belt cords arranged at an angle of 45° or smaller relative to tire equator, for example. The belt plies are stacked on each other so that belt cords embedded in the belt plies cross in different directions from each other. A band layer (not shown) may further be provided outside belt layer 6. In this case, the band layer is formed of a continuous ply having an organic fiber cord of low modulus wound in a spiral manner almost in parallel with tire equator.

According to the present invention, by employing the structure of tread portion 2 having two layers of at least base tread 2a and cap tread 2b, and by forming the base tread with a prescribed rubber composition, it is possible to improve maneuver stability while maintaining riding comfort. The structure of the pneumatic tire according to the present invention is not limited to that as detailed above.

The tire tread in the pneumatic radial tire of the present invention includes at least two layers of the base tread and the cap tread arranged outwardly in the radial direction of the base tread, the base tread being formed by a base tread rubber composition obtained by compounding at least 2-20 parts by weight of a kraft paper ground product relative to 100 parts by weight of a rubber component.

With the base tread rubber compound forming the base tread of the present invention, kraft paper ground product is compounded. The kraft paper ground product refers to short fibers obtained by grinding, for example, kraft papers. In the present invention, the base tread including the kraft paper ground product attains rigidity of the base tread at low costs. Additionally, the rigidity of the base tread can easily and arbitrarily be controlled by appropriately setting the type and the compounding amount of the kraft paper ground product. A compounding amount of the kraft paper ground product being at least 2 parts by weight can fully exert the reinforcing effect from compounding the kraft paper ground product on the base tread. A compounding amount thereof being at most 20 parts by weight can prevent deterioration of riding comfort due to excessively hardened base tread, and impairment of durability due to reduction in tensile strength or the like. Preferably, the compounding amount of the kraft paper ground product is further at least 3 parts by weight, and still further it is at least 4 parts by weight. Preferably, it is at most 15 parts by weight, and further it is at most 10 parts by weight.

The kraft paper ground product compounded in the present invention generally refers to papers obtained through a papermaking process of kraft pulp (KP), and it includes unbleached kraft papers and bleached kraft papers. The kraft pulp is the mainstream of the pulps classified into chemical pulp. Since it generally has a relatively long fiber length, the kraft paper is widely applied to packages as the paper with excellent strength. While either needleleaf kraft pulp or broadleaf kraft pulp may be employed as the kraft pulp, needleleaf kraft pulp is preferable for its relatively long fiber length.

The kraft pulp is generally manufactured in the following method. First, the material chips are processed so that impurities are removed and their thickness, length and the like are made uniform in a certain range. Next, the chips are cooked at high temperatures, for example at about 150-160° C. with agents such as caustic soda and sodium sulfide, to dissolve mainly lignin among other components in the chips, and thus pulped. Following a washing process for separating the dissolved lignin and the agents from the pulp, the pulp is processed with oxide and alkali, for example, to further dissolve the remaining lignin in the pulp. Finally, foreign materials are removed and the pulp is washed to obtain the unbleached pulp. The unbleached pulp may further undergo a bleaching process to be the bleached pulp. Through papermaking of the unbleached kraft pulp and the bleached kraft pulp, unbleached kraft paper and bleached craft paper can be manufactured, respectively.

An average diameter (D) of the kraft paper ground product compounded in the present invention preferably falls within a range of 0.5-50 μm, for example. An average length (L) is preferably at least 10 μm, and particularly at least 50 μm, and particularly preferably, it is at most 1000 μm. A ratio (L)/(D) of average length (L) to average diameter (D) is preferably at least 10, and further preferably at least 20, and it is preferably at most 2000, and further preferably, it is at most 1800. With (L)/(D) of at least 10, an increase in the rigidity of the base tread from compounding the kraft paper ground product is realized in an excellent manner to the desired degree, and with (L)/(D) of at most 2000, insufficient dispersion of the kraft paper ground product in the rubber composition forming the base tread is prevented in an excellent manner. It is noted that average diameter (D) and average length (L) of the kraft paper ground product can be evaluated by means of a method such as calculation from an image analysis of an image that has been taken using a scanning electron microscope, for example.

In the base tread provided to the pneumatic radial tire of the present invention, a ratio $E^*a/E^*b$ of a complex elastic modulus in the tire circumferential direction $E^*a$ to a complex elastic modulus in the tire radial direction $E^*b$ is set to be at least 1.5, each of the complex elastic moduli being measured at a temperature of 70° C., a frequency of 10 Hz, and a dynamic strain of ±1% at a tire maximum width position in a state where the tire is attached to a rim and filled to a prescribed internal pressure. While it is effective to increase the rigidity of the tire tread in order to improve maneuvering stability, riding comfort may be sacrificed if the rigidity is simply increased. In the present invention, rigidity is increased in the tire circumferential direction to ensure maneuvering stability. Physical properties are controlled to attain relatively lower rigidity in the tire radial direction than in the tire circumferential direction, so that vibrations due to unevenness of the road surface is effectively absorbed, and riding comfort is ensured. Thus, with this pneumatic radial tire of the present invention, maneuvering stability can be improved while riding comfort is maintained.

In the above description, $E^*a/E^*b$ of at least 1.5 is preferable as both riding comfort and maneuver stability are excellent, and also performances are excellent in balance. Further, $E^*a/E^*b$ of at least 1.6 is particularly preferable, and it is particularly preferable to be at most 10, and further to be at most 9. With $E^*a/E^*b$ of at most 10, the tire circumferential direction and the tire radial direction may not attain excessively high or low rigidity, whereby compatibility between riding comfort and maneuver stability is established and an excessive decrease in wear-resistance, durability and the like may be prevented.

In the present invention, preferably the above-described complex elastic modulus $E^*a$ is at least 10 MPa and at most 50 MPa. With $E^*a$ of at least 10 MPa, the base tread has the sufficient rigidity and thus maneuver stability is excellent. When it is at most 50 MPa, riding comfort and durability are less likely to be impaired. Further, in the present invention, preferably the above-described complex elastic modulus $E^*b$ is at least 4 MPa and at most 11 MPa. With $E^*b$ of at least 4 MPa, maneuver stability is excellent, and with $E^*b$ of at most 11 MPa, riding comfort and durability are less likely to be impaired.

Anisotropy of the complex elastic modulus of the tire circumferential direction and that of the tire radial direction in the base tread can arbitrarily be set by a method for controlling the orientation state of the kraft paper ground product in the base tread rubber composition through adjustment of extrusion condition of the tread rubber composition, for example. Specifically, for example by orientating the kraft paper ground product along the tire circumferential direction, anisotropy can be controlled so that rigidity is higher in the tire circumferential direction than in the tire radial direction.

In the present invention, preferably tensile strength in the tire circumferential direction of the base tread is at least 11 MPa, further it is at least 12 MPa, and particularly it is at least 13 MPa. With a tensile strength in the tire circumferential direction of at least 11 MPa, maneuver stability and durability may be excellent. It is noted that tensile strength can be measured in accordance with the Japanese Industrial Standards (JIS) K6251.

Preferably, rubber hardness of the base tread of the present invention is set to fall within a range of 60-75, for example. With a hardness of at least 60, maneuver stability, wear-resistance and durability can be ensured to the desired degree, and with a hardness of at most 75, riding comfort and durability are excellent. It is noted that hardness can be measured in conformity with ISO-7619.

The tire tread of the present invention has at least two layers of the base tread and the cap tread arranged externally in the radial direction of the base tread. The base tread of the present invention is set to attain high rigidity by compounding the craft paper ground product. Providing the base tread of the present invention, excellent maneuver stability of the tire is realized. However, when the base tread of high rigidity is directly in contact with the road surface, it is often difficult to absorb vibrations due to uneven road surface, and excellent riding comfort is hardly obtained. In the present invention, the cap tread provided externally in the radial direction of the base tread absorbs vibrations due to uneven road surface, and thus excellent riding comfort can be obtained. In the present invention, it is preferable to provide the cap tread of which rigidity is set lower than that of the base tread. In this case, advantageously, the base tread with relatively high rigidity contributes in attaining excellent maneuver stability, and the cap tread with relatively low rigidity contributes in attaining excellent riding comfort. Specifically, it is preferable that rubber hardness of the base tread is set to fall within a range of 65-75, for example, whereas rubber hardness of the cap tread is set to fall within a range of 60-70, for example. Further, it is also preferable that complex elastic modulus in the tire circumferential direction $E^*a$ of the base tread, which is measured at a temperature of 70° C., a frequency of 10 Hz, and a dynamic strain of ±1% at a tire maximum width position in a state where the tire is attached to a rim and filled to a prescribed internal pressure, is set to fall within a range of 10-50 MPa, for example, and complex elastic modulus in the tire circumferential direction $E^*c$ of the cap tread, which is measured at a temperature of 70° C., a frequency of 10 Hz, and a dynamic strain of ±1% at a tire maximum width position in a state where the tire is attached to a rim and filled to a prescribed internal pressure, is set to fall within a range of 5-8 MPa, for example. Further, it is also preferable that a ratio $E^*a/E^*c$ of $E^*a$ to $E^*c$ is set to fall within a range of 1.1-10, for example.

While the tire tread of the present invention may be formed with the two-layered structure of the base tread and the cap tread, it may be formed with a three or more-layered structure having another layer, depending on the purpose.

In the present invention, it is preferable that thickness W2 of the base tread relative to total thickness W1 of the tire tread shown in FIG. 1 is set to fall within a range of 5-40%, for example. The base tread having a thickness of at least 5% of which rigidity is increased by compounding the kraft paper ground product contributes in attaining excellent maneuver stability, and the base tread having a thickness of at most 40% is less likely to largely impair riding comfort.

The rubber composition forming each layer of the tire tread of the present invention can be prepared using the following compound components, for example. The compound components are detailed in the following, although they are not limited thereto.

Preferable examples of rubber components that may be compounded with the rubber composition are natural rubber (NR) and/or a diene type synthetic rubber. As the diene type synthetic rubber, styrene-butadiene rubber (SBR), polybutadiene rubber (BR), polyisoprene rubber (IR), ethylene-propylene-diene rubber (EPDM), chloroprene rubber (CR), acrylonitrile-butadiene rubber (NBR), butyl rubber (IIR) and the like can be used. At least one or two of these rubbers can be contained in the rubber component. The ethylene-propylene-diene rubber (EPDM) contains ethylene-propylene rubber (EPM) and third diene component. The third diene component here is nonconjugated diene having the carbon number of 5 to 20, and examples thereof are 1,4-pentadiene, 1,4-hexadiene, 1,5-hexadiene, 2,5-dimethyl-1,5-hexadiene and 1,4-octadiene, cyclic diene such as 1,4-cyclohexadiene, cyclooctadiene, dicyclopentadiene and the like for example, and alkenyl norbornene such as 5-ethylidene-2-norbornene, 5-butylidene-2-norbornene, 2-methallyl-5-norbornene and 2-isopropenyl-5-norbornene for example. Among these diene materials, particularly the dicyclopentadiene, 5-ethylidene-2-norbornene and the like can preferably be used.

In the present invention, for at least the base tread rubber composition of the above-listed rubber compositions, preferably a silane coupling agent is compounded by 0.1-5.0 parts by weight relative to 100 parts by weight of the rubber component. With the base tread rubber composition used in the present invention, the kraft paper ground product is compounded. As the kraft paper ground product includes as its major components cellulose and hemicellulose that are polysaccharide, hydroxyl group and the like of the polysaccharide and the silane coupling agent react to provide an excellent reinforcement effect to the rubber composition. Accordingly, when the silane coupling agent is compounded with the base tread rubber composition of the present invention, wear-resistance and maneuver stability of the tire can remarkably be improved. With a compounding amount of silane coupling agent of at least 0.1 parts by weight relative to 100 parts by weight of a rubber component, the effect of improving wear-resistance and maneuver stability is attained in an excellent manner. With a compounding amount of silane coupling agent of at most 5.0 parts by weight, burning (scorching) in a kneading process and an extrusion process of the rubber is less likely to occur. In view of reaction efficiency, dispersibility in processing and the like, particularly a sulfur-containing silane coupling agent is preferably used. Examples of the sulfur-containing silane coupling agent that can be used are 3-trimethoxysilylpropyl-N, N-dimethylthiocarbamoil-tetrasulfide, trimethoxysilylpropyl-mercaptobenzothiazole tetrasulfide, triethoxysilylpropyl-methacrylate-monosulfide, dimethoxymethylsilylpropyl-N,N-dimethylthiocarbamoil-tetrasulfide, bis-[3-(triethoxysilyl)-propyl]tetrasulfide, 3-mercaptopropyl trimethoxysilane and the like.

Other examples of the silane coupling agent that can be used are vinyl trichlorosilane, vinyl tris(2-methoxy ethoxy) silane, γ-glycidoxypropyltrimethoxysilane, γ-methacryloxypropyltrimethoxysilane, γ-(2-aminoethyl) aminopropyltrimethoxysilane, γ-chloropropyltrimethoxysilane, γ-aminopropyltriethoxysilane and the like.

According to the present invention, other coupling agents, for example, aluminate type coupling agent or titanate type coupling agent may be used or used together with the silane coupling agent depending on applications.

With the rubber components listed above, silica may be compounded by at least 5 parts by weight and at most 100 parts by weight as a filler relative to 100 parts by weight of the aforementioned rubber component. Silica generally used for general purpose rubbers can be employed, and examples thereof may be dry process white carbon, wet process white carbon, colloidal silica and the like which are employed as reinforce agents, for example. In particular, wet process white carbon containing hydrous silica as its major component is preferable. With a compounding amount of silica of at least 5 parts by weight, the reinforce effect on the rubber component is excellent and wear-resistance of the tire can be improved by the desired degree. With a compounding amount of silica of at most 100 parts by weight, a decrease in processability due to an increase in viscosity of unvulcanized rubber components or an excessive increase in the costs in manufacturing the rubber composition for a tire can be prevented.

Preferably, the silica used as above has a nitrogen adsorption specific surface area (BET) that falls within a range of 50-300 $m^2/g$, and further within 100-200 $m^2/g$, for example. With silica having a nitrogen adsorption specific surface area (BET) of at least 50 $m^2/g$, the reinforce effect on the rubber composition is sufficiently attained, whereby wear-resistance of the tire is improved in an excellent manner. With silica having a nitrogen adsorption specific surface area (BET) of at most 300 $m^2/g$, processability of the rubber component is excellent, and maneuver stability is sufficiently ensured. Here, the nitrogen adsorption specific surface area is a value measured by BET method in conformity with ASTM D3037-81.

With the rubber components listed above, additionally, fillers such as carbon black, clay, alumina, talc, calcium carbonate, magnesium carbonate, aluminum hydroxide, magnesium hydroxide, magnesium oxide, titan oxide and the like can be used singularly or as a mixture of at least two.

Here, preferably, carbon black is compounded by at least 10 parts by weight and at most 15 parts by weight relative to 100 parts by weight of the rubber compound. As to carbon black, preferably, a nitrogen adsorption specific surface area (BET) thereof falls within a range of 70-300 $m^2/g$; DBP oil absorption thereof falls within a range of 5-300 ml/100 g; and iodine adsorption falls within a range of 146-152 mg/g. When the carbon black having such properties is used, the reinforce effect on the rubber composition is excellent.

To the above-described rubber composition, vulcanizing agent, vulcanization accelerator, softener, plasticizer, antioxidant, blowing agent, antiscorching agent and the like may further be added.

As the vulcanizing agent, organic peroxide or sulfur-based vulcanizing agent may be used. Examples of the organic peroxide that can be employed are benzoyl peroxide, dicumyl peroxide, di-t-butyl peroxide, t-butyl cumyl peroxide, methyl ethyl ketone peroxide, cumene hydroperoxide, 2,5-dimethyl-2,5-di(t-butyl peroxy) hexane, 2,5-dimethyl-2,5-di(benzoyl peroxy) hexane, 2,5-dimethyl-2,5-di(t-butyl peroxy) hexyne-3 or 1,3-bis(t-butyl peroxy propyl) benzene, di-t-butyl peroxy-diisopropyl benzene, t-butyl peroxy benzene, 2,4-dichlorobenzoyl peroxide, 1,1-di-t-butyl peroxy-3,3,5-trimethyl siloxane, n-butyl-4,4-di-t-butyl peroxyvalerate and the like. In particular, the dicumyl peroxide, t-butyl peroxy benzene and di-t-butyl peroxy-diisopropyl benzene are preferred. As the sulfur-based vulcanizing agent, sulfur and morpholine disulfide can be used and particularly the sulfur is preferred.

As the vulcanizing accelerator, any accelerator can be employed that contains at least one of sulfenamide type accelerator, thiazole type accelerator, thiuram type accelerator, thiourea type accelerator, guanidine type accelerator, dithiocarbamate type accelerator, aldehyde-amine type or aldehyde-ammonia type accelerator, imidazoline type accelerator and xanthate type accelerator.

Examples of the sulfenamide type accelerator are sulfenamide type compounds such as CBS (N-cyclohexyl-2-benzothiazyl sulfen amide), TBBS (N-t-butyl-2-benzothiazyl sulfen amide), N,N-dicyclohexyl-2-benzothiazyl sulfen amide, N-oxydiethylene-2-benzothiazyl sulfen amide, N,N-diisopropyl-2-benzothiazole sulfen amide and the like.

Examples of the thiazole type accelerator are MBT (2-mercaptobenzothiazole), MBTS (dibenzothiazyl disulfide), sodium salt of 2-mercaptobenzothiazole, zinc salt of 2-mercaptobenzothiazole, copper salt of 2-mercaptobenzothiazole, cyclohexyl amine salt, 2-(2,4-dinitrophenyl) mercaptobenzothiazole, 2-(2,6-diethyl-4-morpholinothio) benzothiazole and the like.

Examples of the thiuram type accelerator are TMTD (tetramethylthiuram disulfide), tetraethylthiuram disulfide, tetramethylthiuram monosulfide, dipentamethylenethiuram disulfide, dipentamethylenethiuram monosulfide, dipentamethylenethiuram tetrasulfide, dipentamethylenethiuram hexasulfide, tetrabutylthiuram disulfide, pentamethylenethiuram tetrasulfide and the like.

Examples of the thiourea type accelerator are thiourea compounds such as thiocarbamide, diethyl thiourea, dibutyl thiourea, trimethyl thiourea, diorthotolyl thiourea and the like.

Examples of the guanidine type accelerator are guanidine-based compounds such as diphenylguanidine, diorthotolyl guanidine, triphenylguanidine, orthotolylbiguanide, diphenylguanidine phthalate and the like.

Examples of the dithiocarbamate type accelerator are dithiocarbamate type compounds such as zinc ethylphenyl dithiocarbamate, zinc butylphenyl dithiocarbamate, sodium dimethyl dithiocarbamate, zinc dimethyl dithiocarbamate, zinc diethyl dithiocarbamate, zinc dibutyl dithiocarbamate, zinc diamyl dithiocarbamate, zinc dipropyl dithiocarbamate, complex salt of zinc pentamethylene dithiocarbamate and piperidine, zinc hexadecyl (or octadecyl) isopropyl dithiocarbamate, zinc dibenzyl dithiocarbamate, sodium diethyl dithiocarbamate, piperidine pentamethylene dithiocarbamate, selenium dimethyl dithiocarbamate, tellurium diethyl dithiocarbamate, cadmium diamyl dithiocarbamate and the like.

Examples of aldehyde-amine type or aldehyde-ammonia type accelerator are reaction product of acetaldehyde and aniline, condensation product of butylaldehyde and aniline, hexamethylene tetramine, reaction product of acetaldehyde and ammonia and the like.

The antioxidant (degradation inhibitor) can appropriately be selected for use from amine type antioxidant, phenol type antioxidant, imidazole type antioxidant, metal salt of carbamate, wax and the like.

According to the present invention, softener can be used in combination with other ingredients in order to further enhance processability in kneading. Examples of the softener are petroleum softener such as process oil, lubricating oil, paraffin, liquid paraffin, petroleum asphalt, petrolatum and the like, fatty oil type softener such as castor oil, linseed oil, rape oil, coconut oil and the like, waxes such as tall oil, factice, beeswax, carnauba wax, lanoline and the like, and fatty acid such as linoleic acid, palmitic acid, stearic acid, lauric acid and the like.

Additionally, plasticizer may be used in the present invention as required, such as DMP (dimethyl phthalate), DEP (diethyl phthalate), DBP (dibutyl phthalate), DBP (diheptyl phthalate), DOP (dioctyl phthalate), DINP (diisononyl phthalate), DIDP (diisodecyl phthalate), BBP (butyl benzyl phthalate), DLP (dilauryl phthalate), DCHP (dicyclohexyl phthalate), hydrophthalic anhydride ester, DOZ (azelic acid di-2-ethylhexyl), DBS (dibutyl sebacate), DOS (dioctyl sebacate), acetyl triethyl citrate, acetyl tributyl citrate, DBM (dibutyl maleate), DOM (maleate-2-ethylhexyl), DBF (dibutyl fumarate) and the like.

According to the present invention, an antiscorching agent may be used for preventing or retarding scorching, for example, organic acid such as phthalic anhydride, salicylic acid and benzoic acid, nitroso compound such as N-nitroso diphenylamine, N-cyclohexyl thiophthalimide and the like.

EXAMPLES

In the following, the present invention will be described in detail with reference to specific examples. The present invention, however, is not limited thereto.

The compound components shown in Table 1 except for sulfur and vulcanization accelerator were kneaded at about 150° C. for 5 minutes using Banbury, and then sulfur and vulcanization accelerator were added and kneaded at about 80° C. for 5 minutes using a biaxial open roll, to obtain a base tread rubber composition. The compounding components shown in Table 2 except for sulfur and vulcanization accelerator were kneaded at about 150° C. for 5 minutes using Banbury, and then sulfur and vulcanization accelerator were added and kneaded at about 80° C. for 5 minutes using a biaxial open roll, to obtain a cap tread rubber composition.

Thus obtained base tread rubber composition and cap tread rubber composition are stacked by an extruder to prepare a rubber sheet, and formed as a tire tread, which was vulcanized under the conditions of 150° C. with 25 kgf (245.16625N) for 35 minutes to prepare a test sample tire.

(Complex Elastic Modulus)

From the vulcanized base tread portion, a rectangular sample of width 4 mm×length 30 mm×thickness 1.5 mm was prepared. By means of a viscoelasticity spectrometer manufactured by Iwamoto Seisakusho, under the conditions that temperature was 70° C., frequency was 10 kHz, and dynamic strain was ±1%, complex elastic moduli of the base tread in directions that correspond to tire circumferential direction and radial direction. The result is shown in Table 1.

(Maneuver Stability and Riding Comfort)

The test sample tire having a size of 195/65R15 obtained as above was attached to a vehicle and driven at 40-100 km/h in a test course, to evaluate maneuver stability and riding comfort by a feeling test for steering responsiveness, rigidity feeling, and gripping. The evaluation was represented by 5 point scale based on the following criteria, and average values of three drivers were represented by an index where Conventional Example 1 is 100. A greater value means that maneuver stability and riding comfort are excellent. The result is shown in Table 1.

5 points: superior to Conventional Example 1

4 points: slightly superior to Conventional Example 1

3 points: equivalent to Conventional Example 1

2 points: slightly inferior to Conventional Example 1

1 point: inferior to Conventional Example 1

(Tensile Test)

From the vulcanized base tread portion, a sample was punched by means of #3 dumbbell to evaluate tensile strength in accordance with JIS-K6251. The result is shown in Table 1.

TABLE 1

|  |  | Conventional Example 1 | Example 1 | Example 2 | Example 3 | Example 4 | Comparative Example 1 | Comparative Example 2 | Comparative Example 3 | Comparative Example 4 |
|---|---|---|---|---|---|---|---|---|---|---|
| base tread compounding | NR(*1) | 100 | 100 | 100 | 100 | 100 | 100 | 100 | 100 | 100 |
|  | carbon black 1(*2) | 50 | 50 | 50 | 50 | 50 | 50 | 50 | 50 | 50 |
|  | kraft paper ground product(*3) | — | 5 | 10 | 20 | 10 | 30 | — | — | — |
|  | vinylon fiber(*4) | — | — | — | — | — | — | — | 10 | 10 |
|  | antioxidant 6C(*5) | 2 | 2 | 2 | 2 | 2 | 2 | 2 | 2 | 2 |
|  | wax(*6) | 2 | 2 | 2 | 2 | 2 | 2 | 2 | 2 | 2 |
|  | aromatic oil(*7) | 4 | 4 | 4 | 4 | 4 | 4 | 4 | 4 | 4 |
|  | stearic acid(*8) | 4 | 4 | 4 | 4 | 4 | 4 | 4 | 4 | 4 |
|  | zinc oxide(*9) | 4 | 4 | 4 | 4 | 4 | 4 | 4 | 4 | 4 |
|  | cured resin(*10) | 5 | 5 | 5 | 5 | 5 | 5 | 10 | 5 | 5 |
|  | silane coupling agent(*11) | — | — | — | — | 1 | — | — | — | 1 |
|  | sulfur(*12) | 1.5 | 1.5 | 1.5 | 1.5 | 1.5 | 1.5 | 1.5 | 1.5 | 1.5 |
|  | vulcanization accelerator NS(*13) | 1 | 1 | 1 | 1 | 1 | 1 | 1 | 1 | 1 |
|  | vulcanization accelerator H(*14) | 0.5 | 0.5 | 0.5 | 0.5 | 0.5 | 0.5 | 1 | 0.5 | 0.5 |
| complex elastic modulus E*a(MPa) | | 10 | 16 | 20 | 25 | 22 | 30 | 23 | 13 | 13 |
| complex elastic modulus E*b(MPa) | | 10 | 10 | 10.5 | 11 | 10.5 | 12 | 23 | 10 | 10 |
| E*a/E*b | | 1 | 1.60 | 1.90 | 2.27 | 2.10 | 2.50 | 1.00 | 1.30 | 1.30 |
| complex elastic modulus E*c(MPa) | | 7 | 7 | 7 | 7 | 7 | 7 | 7 | 7 | 7 |
| base tread thickness (mm) A | | 2 | 2 | 2 | 2 | 2 | 2 | 2 | 2 | 2 |
| tire tread total thickness (mm) B | | 10 | 10 | 10 | 10 | 10 | 10 | 10 | 10 | 10 |
| A/B | | 0.2 | 0.2 | 0.2 | 0.2 | 0.2 | 0.2 | 0.2 | 0.2 | 0.2 |
| maneuver stability | | 100 | 107 | 109 | 115 | 110 | 116 | 115 | 103 | 103 |
| riding comfort | | 100 | 98 | 97 | 96 | 97 | 95 | 88 | 98 | 98 |
| tensile strength (MPa) | | 15 | 14 | 13 | 12 | 15 | 10 | 9 | 10 | 10 |

TABLE 2

| cap tread compounding | parts by weight |
|---|---|
| SBR(*15) | 70 |
| BR(*16) | 30 |
| carbon black 1(*2) | 60 |
| antioxidant 6C(*5) | 2 |
| wax(*6) | 2 |
| aromatic oil(*7) | 4 |
| stearic acid(*8) | 2 |
| zinc oxide(*9) | 4 |
| sulfur(*12) | 1.5 |
| vulcanization accelerator NS(*13) | 1.0 |

(*1)NR: "RSS#3" made in Thai
(*2)carbon black 1: "N220" from Mitsubishi Chemical Corporation
(*3)kraft paper ground product: "millfive#100" from Sankyo Seifun Co., Ltd.
(*4)vinylon fiber: PVA (polyvinyl alcohol) short fibers from Kuraray
(*5)antioxidant 6C: "Ozonon" 6C from Seiko Chemical Co., Ltd.
(*6)wax: "Sunnoc Wax" from Ouchishinko Chemical Industrial Co., Ltd.
(*7)aromatic oil: process oil "Diana Process AH40" from Idemitsu Kosan Co., Ltd.
(*8)stearic acid: "Kiri" from NOF Corporation
(*9)zinc oxide: "Ginrei R" from Toho Zinc Co., Ltd.
(*10)cured resin: Sumilite resin "PR12686" from Sumitomo Durez Co., Ltd.
(*11)silane coupling agent: "Si266" from Degussa
(*12)sulfur: sulfur from Tsurumi Chemical Industry Co., Ltd.
(*13)vulcanization accelerator NS: "Nocceler NS" (N-ter-butyl-2-benzothiazolylsulfenamide) from Ouchishinko Chemical Industrial Co., Ltd.
(*14)vulcanization accelerator H: "Nocceler H" from Ouchishinko Chemical Industrial Co., Ltd.
(*15)SBR: "SBR1502" from Sumitomo Chemical Co., Ltd.
(*16)BR: "UBEPOL 150B" from Ube Industries, Ltd.

From the result shown in Table 1, as compared to Comparative Example 1 having a large compounding amount of the kraft paper ground product, Examples 1-4 to which the base tread of the present invention was provided show great tensile strength that contributes to durability, and thus they are excellent. Further, as compared to Comparative Example 2 with which cured resin was compounded and in which complex elastic moduli of the base tread in both tire circumferential direction and tire radial direction were set to be great, Examples 1-4 to which the base tread of the present invention was provided are excellent in riding comfort. When complex elastic moduli are increased in both tire circumferential direction and tire radial direction, vibrations due to unevenness of the road surface are hardly absorbed and thus excellent riding comfort is hardly obtained. Additionally, as compared to Comparative Example 3 with which vinylon fibers was compounded together with cured resin, Examples 1-4 exhibit excellent maneuver stability by the reinforce effect obtained by compounding the kraft paper ground product. As compared to Comparative Example 4 with which the silane coupling agent was compounded together with vinylon fibers, Examples 1-4 have great tensile strength and also excellent in maneuver stability. In particular, Example 4 with which the silane coupling agent was compounded together with kraft paper ground product exhibits great tensile strength.

As compared to Conventional Example 1 and Comparative Examples 2-4 in which a ratio between E*a/E*b of complex elastic modulus in tire circumferential direction E*a and complex elastic modulus in tire radial direction E*b of the base tread is smaller than 1.5, it can clearly be seen that Examples 1-4 provided with the base tread having E*a/E*b of at least 1.5 achieve great improvement in maneuver stability without largely impairing riding comfort.

Although the present invention has been described and illustrated in detail, it is clearly understood that the same is by way of illustration and example only and is not to be taken by way of limitation, the spirit and scope of the present invention being limited only by the terms of the appended claims.

What is claimed is:

1. A pneumatic radial tire, comprising a tire tread including at least two layers of a base tread and a cap tread arranged externally in a radial direction of said base tread, wherein said base tread is formed by a base tread rubber composition including at least 2-20 parts by weight of a kraft paper ground product relative to 100 parts by weight of a rubber component, said base tread has its ratio $E^*a/E^*b$ of a complex elastic modulus in a circumferential direction $E^*a$ to a complex elastic modulus in a tire radial direction $E^*b$ set to fall within a range of 1.6-2.27, each of said complex elastic moduli $E^*a$ and $E^*b$ being measured at a temperature of 70° C., a frequency of 10 Hz, and a dynamic strain of ±1% at a tire maximum width position in a state where the tire is attached to a rim and filled to a prescribed internal pressure, and a ratio $E^*a/E^*c$ of said complex elastic modulus $E^*a$ of said base tread to a complex elastic modulus in the tire circumferential direction $E^*c$ of said cap tread is set to fall within a range of 1.1-10, each of said complex elastic moduli $E^*a$ and $E^*c$ being measured at a temperature of 70° C., a frequency of 10 Hz, and a dynamic strain of ±1% at a tire maximum width position in a state where the tire is attached to a rim and filled to a prescribed internal pressure.

2. The pneumatic radial tire according to claim 1, wherein a tensile strength of said base tread in the tire circumferential direction is at least 10 MPa.

3. The pneumatic radial tire according to claim 1, wherein said base tread rubber composition includes 0.1-5 parts by weight of a silane coupling agent relative to 100 parts by weight of the rubber component.

4. The pneumatic radial tire according to claim 1, wherein a thickness of said base tread relative to a total thickness of said tire tread is set to fall within a range of 5-40%.

5. The pneumatic radial tire according to claim 1, wherein an average length of said kraft paper ground product falls within a range of 10-1000 μm.

* * * * *